(12) United States Patent
Sim et al.

(10) Patent No.: US 12,548,529 B2
(45) Date of Patent: Feb. 10, 2026

(54) METHODS FOR DRIVING ELECTRO-OPTIC DISPLAYS

(71) Applicant: E INK CORPORATION, Billerica, MA (US)

(72) Inventors: Teck Ping Sim, Acton, MA (US); Yuval Ben-Dov, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/383,614

(22) Filed: Oct. 25, 2023

(65) Prior Publication Data

US 2024/0135891 A1 Apr. 25, 2024
US 2024/0233662 A9 Jul. 11, 2024

Related U.S. Application Data

(60) Provisional application No. 63/419,330, filed on Oct. 25, 2022.

(51) Int. Cl.
| | |
|---|---|
| G09G 3/34 | (2006.01) |
| G06F 3/04845 | (2022.01) |
| G06F 3/0485 | (2022.01) |
| G06F 3/0488 | (2022.01) |

(52) U.S. Cl.
CPC ......... G09G 3/344 (2013.01); G06F 3/04845 (2013.01); G06F 3/0485 (2013.01); G06F 3/0488 (2013.01); G06F 2203/04806 (2013.01); G09G 2310/0232 (2013.01); G09G 2310/061 (2013.01); G09G 2320/0257 (2013.01); G09G 2320/0295 (2013.01); G09G 2354/00 (2013.01)

(58) Field of Classification Search
CPC ....... G06F 2203/04806; G06F 3/04845; G06F 3/0485; G06F 3/0488; G09G 2310/0232; G09G 2310/04; G09G 2310/061; G09G 2320/0209; G09G 2320/0257; G09G 2320/0295; G09G 2354/00; G09G 3/344; G09G 5/34
See application file for complete search history.

(56) References Cited

U.S. PATENT DOCUMENTS

| | | | |
|---|---|---|---|
| 4,418,346 | A | 11/1983 | Batchelder |
| 5,760,761 | A | 6/1998 | Sheridon |
| 5,777,782 | A | 7/1998 | Sheridon |
| 5,808,783 | A | 9/1998 | Crowley |

(Continued)

OTHER PUBLICATIONS

European Patent Office, "International Search Report and Written Opinion", PCT/US2023/035884, Mar. 4, 2024. Mar. 4, 2024.

(Continued)

*Primary Examiner* — Hong Zhou
(74) *Attorney, Agent, or Firm* — Jason P. Colangelo

(57) ABSTRACT

A method is described for driving an electro-optic display having a plurality of display pixels. The method includes updating the electro-optic display with a first image including image data from a first portion of a scrollable content. The method also includes receiving a user input comprising one or more parameters, and generating a second image based on at least one parameter of the user input. The second image includes: a subset of the image data from the first portion of the scrollable content, and image data from a second portion of the scrollable content. The method also includes updating the electro-optic display with the second image.

9 Claims, 15 Drawing Sheets

1570 / 1401a

1580 / 1401b

1402

(56) References Cited

U.S. PATENT DOCUMENTS

| | | |
|---|---|---|
| 5,872,552 A | 2/1999 | Gordon, II et al. |
| 5,930,026 A | 7/1999 | Jacobson et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,259,744 B2 | 8/2007 | Arango et al. |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,715,088 B2 | 5/2010 | Liang et al. |
| 7,839,564 B2 | 11/2010 | Whitesides et al. |
| 7,859,742 B1 | 12/2010 | Chiu et al. |
| 7,952,557 B2 | 5/2011 | Amundson |
| 7,956,841 B2 | 6/2011 | Albert et al. |
| 7,982,479 B2 | 7/2011 | Wang et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,314,784 B2 | 11/2012 | Ohkami et al. |
| 8,373,649 B2 | 2/2013 | Low et al. |
| 8,384,658 B2 | 2/2013 | Albert et al. |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,605,032 B2 | 12/2013 | Liu et al. |
| 8,665,206 B2 | 3/2014 | Lin et al. |
| 8,681,191 B2 | 3/2014 | Yang et al. |
| 8,810,525 B2 | 8/2014 | Sprague |
| 8,928,562 B2 | 1/2015 | Gates et al. |
| 8,928,641 B2 | 1/2015 | Chiu et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,218,773 B2 | 12/2015 | Sun et al. |
| 9,224,338 B2 | 12/2015 | Chan et al. |
| 9,224,342 B2 | 12/2015 | Lin et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,279,906 B2 | 3/2016 | Kang |
| 9,299,294 B2 | 3/2016 | Lin et al. |
| 9,390,066 B2 | 7/2016 | Smith |
| 9,390,661 B2 | 7/2016 | Chiu et al. |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,743 B2 | 12/2016 | Sjodin et al. |
| 9,514,667 B2 | 12/2016 | Lin |
| 9,612,502 B2 | 4/2017 | Danner et al. |
| 9,620,048 B2 | 4/2017 | Sim et al. |
| 9,672,766 B2 | 6/2017 | Sjodin |
| 9,691,333 B2 | 6/2017 | Cheng et al. |
| 9,721,495 B2 | 8/2017 | Harrington et al. |
| 9,792,861 B2 | 10/2017 | Chang et al. |
| 9,792,862 B2 | 10/2017 | Hung et al. |
| 10,229,641 B2 | 3/2019 | Yang et al. |
| 10,319,313 B2 | 6/2019 | Harris et al. |
| 10,331,326 B2 | 6/2019 | Kawamata |
| 10,339,876 B2 | 7/2019 | Lin et al. |
| 10,444,553 B2 | 10/2019 | Laxton |
| 10,656,818 B1 | 5/2020 | Winters et al. |
| 10,672,350 B2 | 6/2020 | Amundson et al. |
| 11,030,936 B2 | 6/2021 | Emelie et al. |
| 11,132,823 B2 | 9/2021 | Itou |
| 11,289,036 B2 | 3/2022 | Sim et al. |
| 11,520,202 B2 | 12/2022 | Paydavosi et al. |
| 11,568,786 B2 | 1/2023 | Crounse |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0303780 A1 | 12/2008 | Sprague et al. |
| 2009/0174651 A1 | 7/2009 | Jacobson et al. |
| 2010/0194733 A1 | 8/2010 | Lin et al. |
| 2010/0194789 A1 | 8/2010 | Lin et al. |
| 2010/0265561 A1 | 10/2010 | Gates et al. |
| 2011/0063314 A1 | 3/2011 | Chiu et al. |

(56) References Cited

U.S. PATENT DOCUMENTS

| | | | |
|---|---|---|---|
| 2011/0099509 A1* | 4/2011 | Horagai | G06F 3/0485 |
| | | | 715/784 |
| 2011/0175875 A1 | 7/2011 | Lin et al. | |
| 2011/0199671 A1 | 8/2011 | Amundson et al. | |
| 2011/0221740 A1 | 9/2011 | Yang et al. | |
| 2012/0001957 A1 | 1/2012 | Liu et al. | |
| 2012/0084647 A1* | 4/2012 | Homma | G06F 3/0483 |
| | | | 715/273 |
| 2012/0098740 A1 | 4/2012 | Chiu et al. | |
| 2013/0063333 A1 | 3/2013 | Arango et al. | |
| 2013/0141373 A1* | 6/2013 | Takuma | G06F 3/04883 |
| | | | 345/173 |
| 2013/0249782 A1 | 9/2013 | Wu et al. | |
| 2014/0204012 A1 | 7/2014 | Wu et al. | |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2015/0005720 A1 | 1/2015 | Zang et al. | |
| 2015/0220232 A1* | 8/2015 | Smith | G06F 3/04883 |
| | | | 715/788 |
| 2015/0262255 A1 | 9/2015 | Khajehnouri et al. | |
| 2016/0012710 A1 | 1/2016 | Lu et al. | |
| 2016/0162144 A1 | 6/2016 | Rachi | |
| 2016/0180777 A1 | 6/2016 | Lin et al. | |
| 2017/0344212 A1 | 11/2017 | Fujimoto et al. | |
| 2020/0286274 A1* | 9/2020 | Itou | G06F 3/04842 |
| 2021/0150992 A1* | 5/2021 | Sim | G09G 3/344 |
| 2021/0397316 A1* | 12/2021 | Kaptelinin | G06F 3/0485 |
| 2022/0068229 A1 | 3/2022 | Sim et al. | |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Wood, D., "An Electrochromic Renaissance?" Information Display, 18(3), 24 (Mar. 2002).

Bach, Udo et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Ota, I. et al., "Developments in Electrophoretic Displays", Proceedings of the SID, 18, 243 (1977).

Japanese Patent Office, "Official Action and Search Report", Japanese Application No. 2025-521300, Dec. 17, 2025.

* cited by examiner

METHODS FOR DRIVING ELECTRO-OPTIC DISPLAYS

CROSS-REFERENCE TO RELATED APPLICATIONS

This application claims priority to U.S. Provisional Application 63/419,330, filed on Oct. 25, 2022, the entire contents of which are incorporated herein by reference. Further, the entire contents of any patent, published application, or other published work referenced herein are incorporated by reference in their entireties.

FIELD OF THE INVENTION

The present invention relates to methods for driving electro-optic displays, especially bistable electro-optic displays, and to apparatuses for use in such methods. More specifically, this invention relates to driving methods which allow for reduced "ghosting" and edge effects, and reduced flashing in such displays.

BACKGROUND OF THE INVENTION

Electro-optic displays typically have a backplane provided with a plurality of pixel electrodes each of which defines one pixel of the display; conventionally, a single common electrode extending over a large number of pixels, and normally the whole display is provided on the opposed side of the electro-optic medium. The individual pixel electrodes may be driven directly (i.e., a separate conductor may be provided to each pixel electrode) or the pixel electrodes may be driven in an active matrix manner which will be familiar to those skilled in backplane technology. Since adjacent pixel electrodes will often be at different voltages, they must be separated by inter-pixel gaps of finite width in order to avoid electrical shorting between electrodes. Although at first glance it might appear that the electro-optic medium overlying these gaps would not switch when drive voltages are applied to the pixel electrodes (and indeed, this is often the case with some non-bistable electro-optic media, such as liquid crystals, where a black mask is typically provided to hide these non-switching gaps), in the case of many bistable electro-optic media the medium overlying the gap does switch because of an edge artifact phenomenon known as "blooming".

Blooming refers to the tendency for application of a drive voltage to a pixel electrode to cause a change in the optical state of the electro-optic medium over an area larger than the physical size of the pixel electrode. Although excessive blooming should be avoided (for example, in a high resolution active matrix display one does not wish application of a drive voltage to a single pixel to cause switching over an area covering several adjacent pixels, since this would reduce the effective resolution of the display) a controlled amount of blooming is often useful. For example, consider a black-on-white electro-optic display which displays numbers using a conventional seven-segment array of seven directly driven pixel electrodes for each digit. When, for example, a zero is displayed, six segments are turned black. In the absence of blooming, the six inter-pixel gaps will be visible. However, by providing a controlled amount of blooming, for example as described in the U.S. Pat. No. 7,602,374, which is incorporated herein in its entirety, the inter-pixel gaps can be made to turn black, resulting in a more visually pleasing digit. However, blooming can lead to a problem denoted "edge ghosting".

An area of blooming is not a uniform white or black but is typically a transition zone where, as one moves across the area of blooming, the color of the medium transitions from white through various shades of gray to black. Accordingly, an edge ghost will typically be an area of varying shades of gray rather than a uniform gray area, but can still be visible and objectionable, especially since the human eye is well equipped to detect areas of gray in monochrome images where each pixel is supposed to be pure black or pure white.) In some cases, asymmetric blooming may contribute to edge ghosting. "Asymmetric blooming" refers to a phenomenon whereby in some electro-optic media (for example, the copper chromite/titania encapsulated electrophoretic media described in U.S. Pat. No. 7,002,728) the blooming is "asymmetric" in the sense that more blooming occurs during a transition from one extreme optical state of a pixel to the other extreme optical state than during a transition in the reverse direction; in the media described in this patent, typically the blooming during a black-to-white transition is greater than that during a white-to-black one.

As such, driving methods that reduces the ghosting or blooming effects are needed.

SUMMARY OF THE INVENTION

This invention provides a method for driving electro-optic displays, the method includes updating a first portion of the display using a drive scheme, the drive scheme configured to display white text on a black background; performing a time delay subsequent to the updating the first portion of the display; and updating a second portion of the display using the drive scheme to create a swiping motion across the display. In some embodiments, the driving method further comprising removing edge artifacts from display pixels.

In one aspect, the invention features a method for driving an electro-optic display having a plurality of display pixels. The method includes updating the electro-optic display with a first image including image data from a first portion of a scrollable content. The method also includes receiving a user input comprising one or more parameters, and generating a second image based on at least one parameter of the user input. The second image includes: a subset of the image data from the first portion of the scrollable content, and image data from a second portion of the scrollable content. The method also includes updating the electro-optic display with the second image.

In some embodiments of the method, updating the electro-optic display with the second image includes updating a first portion of the electro-optic display with a first segment of the second image, performing a time delay subsequent to the first portion of the electro-optic display, where updating of the electro-optic display is suspended during the time delay, and updating a second portion of the electro-optic display with a second segment of the second image subsequent to the time delay.

In some embodiments, the method further includes applying an edge clearing waveform to the display pixels of the electro-optic display during the time delay. In some embodiments, the method further includes identifying display pixels with edge artifacts using an algorithm configured to flag a display pixel for having edge artifacts based on the display pixel's next optical state and the optical state of at least one of the display pixel's cardinal neighbors, and applying an edge clearing waveform during the time delay to the display pixels flagged by the algorithm.

In some embodiments, the user input includes a swipe gesture on the electro-optic display. In some embodiments, the user input includes a first parameter indicating a direction of the swipe gesture and a second parameter indicating magnitudes of one or more of a speed of the swipe gesture, a linear distance of the swipe gesture, and a pressure of the swipe gesture.

In some embodiments, the position of the first portion of the electro-optic display is based on an initial point of contact of the swipe gesture and the direction of the swipe gesture. In some embodiments, the position of the second portion of the electro-optic display is adjacent to the position of the first portion of the electro-optic display. In some embodiments, a proportion of the subset of the image data from the first portion of the scrollable content to the image data from the second portion of the scrollable content varies depending on the magnitude of the speed of the swipe gesture. In some embodiments, the subset of the image data from the first portion of the scrollable content and the image data from the second portion of the scrollable content are contiguous within the scrollable content.

In another aspect, the invention features a method for driving an electro-optic display having a plurality of display pixels. The method includes updating the electro-optic display with a first image comprising image data, and receiving a user input comprising one or more parameters. The method also includes generating a second image based on at least one parameter of the user input, wherein the second image comprises a subset of the image data of the first image but is enlarged to have dimensions equal to the first image. The method also includes updating the electro-optic display with the second image.

In some embodiments of the method, updating the electro-optic display with the second image includes updating a first portion of the electro-optic display with a first segment of the second image, performing a time delay subsequent to the first portion of the electro-optic display, where updating of the electro-optic display is suspended during the time delay, and updating a second portion of the electro-optic display with a second segment of the second image subsequent to the time delay.

In some embodiments, the method further includes applying an edge clearing waveform to the display pixels of the electro-optic display during the time delay. In some embodiments, the method further includes identifying display pixels with edge artifacts using an algorithm configured to flag a display pixel for having edge artifacts based on the display pixel's next optical state and the optical state of at least one of the display pixel's cardinal neighbors, and applying an edge clearing waveform during the time delay to the display pixels flagged by the algorithm.

In some embodiments, the user input includes a pinch-out zoom gesture on the electro-optic display. In some embodiments, the user input includes a parameter indicating a magnitude of a linear distance of the pinch-out zoom gesture.

In some embodiments, an amount the subset of the image data of the first image is enlarged in the second image is proportional to the magnitude of the linear distance of the pinch-out zoom gesture.

In some embodiments, the position of the first portion of the electro-optic display is based on an initial point of contact of the pinch-out zoom gesture. In some embodiments, the position of the second portion of the electro-optic display is adjacent to the position of the first portion of the electro-optic display. In some embodiments, the second portion of the electro-optic display surrounds the first portion of the electro-optic display. In some embodiments, the second segment of the second image surrounds the first segment of the second image. In some embodiments, the second segment of the second image includes the content of the first segment of the second image.

BRIEF DESCRIPTION OF DRAWINGS

Additional details of one or more embodiments of the subject matter described in this specification are set forth in the accompanying drawings and the description below. Other features, aspects, and advantages of the subject matter will become apparent from the descriptions contained herein and the accompanying drawings. The drawings are not necessarily to scale and elements of similar structures are generally annotated with like reference numerals for illustrative purposes throughout the drawings. However, the specific properties and functions of elements in different embodiments may not be identical. Further, the drawings are only intended to facilitate the description of the subject matter. The drawings do not illustrate every aspect of the described embodiments and do not limit the scope of the present disclosure or claims.

FIG. 14 is an exemplary diagram showing images processed according to embodiments described.

FIG. 15 is an exemplary diagram showing the operation of a method for presenting content in a zoomed mode according to embodiments described herein.

DETAILED DESCRIPTION OF THE INVENTION

Figure 2:
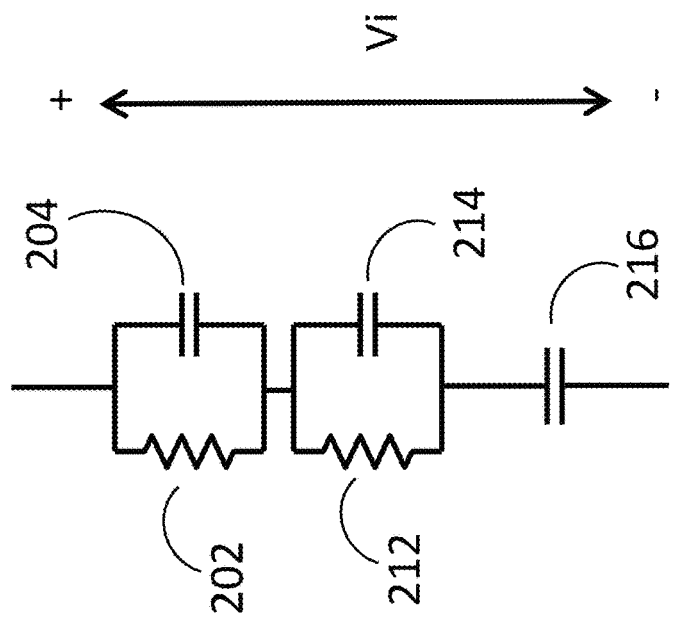
FIG. 2 shows a circuit model of the electro-optic imaging layer.

The present invention relates to methods for driving electro-optic displays, especially bistable electro-optic displays, and to apparatus for use in such methods. More specifically, this invention relates to driving methods which may allow for reduced "ghosting" and edge effects, and reduced flashing in such displays. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the U.S. Pat. No. 7,012,600, which is incorporated herein in its entirety, teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564.
(h) Applications of displays; see for example U.S. Pat. Nos. 7,312,784; 8,009,348;
(i) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710; and
(j) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; 9,412,314; and 9,672,766 and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; 2016/0180777; and 2021/0389637.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in copending application Ser. No. 10/711,802, filed Oct. 6, 2004, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, the patents U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high-resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As in known in the art, voltage is relative and a measure of a charge differential between two points. One voltage value is relative to another voltage value. For example, zero voltage ("0V") refers to having no voltage differential relative to another voltage.) After a pre-selected interval known as the "line address time," a selected row is deselected, another row is selected, and the voltages on the column drivers are changed so that the next line of the display is written.

However, in use, certain waveforms may produce a remnant voltage to pixels of an electro-optic display, and as evident from the discussion above, this remnant voltage produces several unwanted optical effects and is in general undesirable.

As presented herein, a "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in the optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in the optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible. Remnant voltages may give rise to "edge ghosting," a type of ghosting in which an outline (edge) of a portion of a previous image remains visible.

An Exemplary EPD

Figure 1:
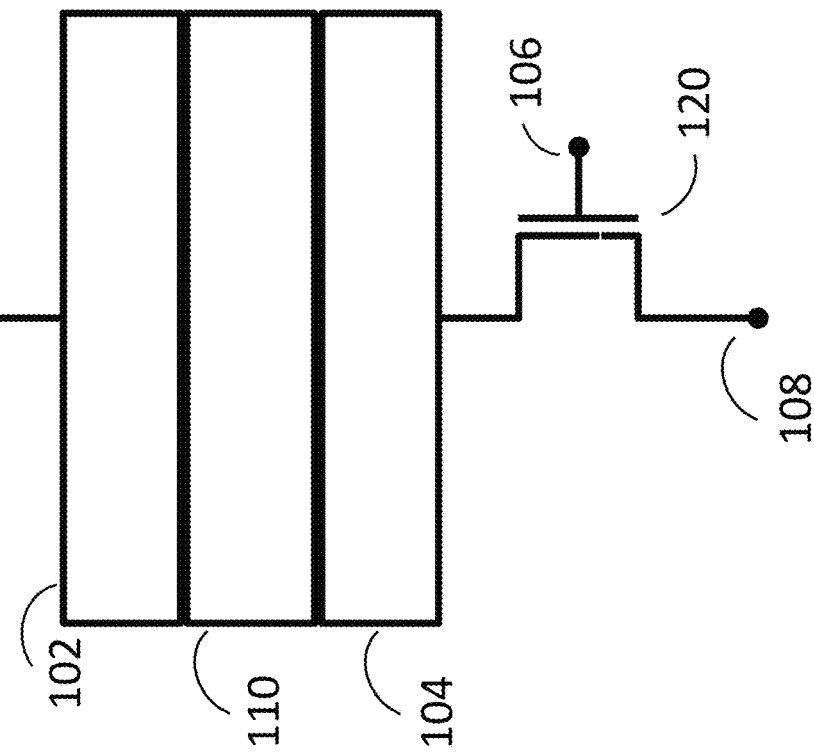
FIG. 1 is a circuit diagram representing an electrophoretic display.

FIG. 1 shows a schematic of a pixel 100 of an electro-optic display in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display that the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

Alternatively, a display may make use of a GSDS simultaneously with a "direct update" drive scheme ("DUDS"). The DUDS may have two or more than two gray levels, typically fewer than the GSDS, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level. In some cases, the transition may be effected by driving from the initial gray level to one extreme optical state, then to the opposed extreme optical state, and only then to the final extreme optical state. See, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Variation in drive schemes is, however, not confined to differences in the number of gray levels used. For example, drive schemes may be divided into global drive schemes, where a drive voltage is applied to every pixel in the region to which the global update drive scheme (more accurately referred to as a "global complete" or "GC" drive scheme) is being applied (which may be the whole display or some defined portion thereof) and partial update drive schemes, where a drive voltage is applied only to pixels that are undergoing a non-zero transition (i.e., a transition in which the initial and final gray levels differ from each other), but no drive voltage is applied during zero transitions (in which the initial and final gray levels are the same). An intermediate form of drive scheme (designated a "global limited" or "GL" drive scheme) is similar to a GC drive scheme except that for a GL drive scheme drive voltage is applied only to pixels that are undergoing a non-zero transition (i.e., a transition in which the initial and final gray levels differ from each other), but no drive voltage is applied during zero transitions (in which the initial and final gray levels are the same). A GL drive scheme is characterized by applying no drive voltages to pixels which are undergoing a zero transition (e.g., white-to-white or black-to-black), meaning these pixels goes through zero or no optical transactions. In, for example, a display used as an electronic book reader displaying black text on a white background, there are numerous white pixels, especially in the margins and between lines of text which remain unchanged from one page of text to the next. Hence, not rewriting these white pixels substantially reduces the apparent "flashiness" of the display rewriting. Similarly, for a display used as an electronic book reader displaying white text on a black background (i.e., a dark mode operation), there are numerous black pixels, especially in the margins and between lines of text which remain unchanged from one page of text to the next. Hence, not rewriting these black pixels substantially reduces the apparent "flashiness" of the display rewriting. Instead, only pixels going through active optical transactions are being updated.

However, certain problems remain in this type of GL drive scheme. Firstly, as discussed in detail in some of the aforementioned MEDEOD applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a GL drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user.

Secondly, when an undriven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the undriven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared. Hitherto, such edge effects (and the effects of color drift in undriven white pixels) have typically been removed by using a single GC update at intervals. Unfortunately, use of such an occasional GC update reintroduces the problem of a "flashy" update, and indeed the flashiness of the update may be heightened by the fact that the flashy update only occurs at long intervals.

In view of the above, the GL mode may be further modified to include algorithms (e.g., a Regal algorithm) configured to clear edge ghosting or blooming artifacts, for example, algorithms as described in U.S. Pat. Nos. 11,030,936 and 11,568,786, which are incorporated herein in their entireties. These algorithms may be configured to apply corrective pulses to the pixels experiencing blooming from neighboring pixels. This new drive mode (e.g., GLR, GLR16) can function to reduce flash while updating a white background with minimal text residues caused by blooming. Other drive schemes, such as those described in U.S. Pat. No. 11,520,202, use waveform selection for optimizing differential blooming reduction depending on the display application.

Figure 3:
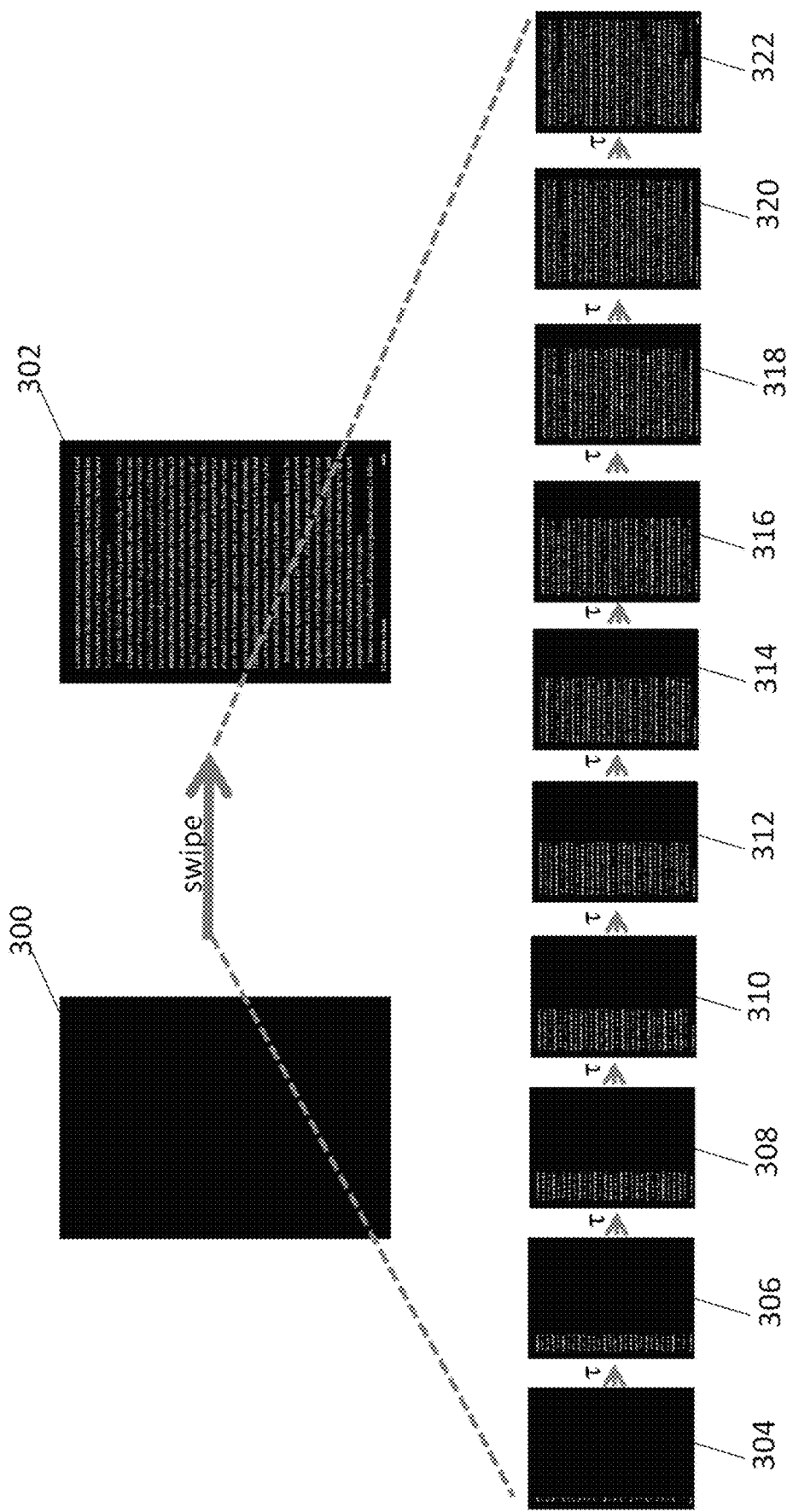
FIG. 3 illustrates a segmented swipe operation under dark mode.

For some applications, an electro-optic display as presented in FIGS. 1 and 2 may be driven with a GL driving scheme to reduce the apparent "flashiness" of the display rewriting operations. Furthermore, in order to improve transition experience to be more fluid as an electro-optic display goes from one page to another, one method is to pipeline the update of the display in segments and do a short delay t (e.g., 10 ms to 20 ms) from one segment to another. For example, the driving method presented herein firstly updates a first portion of a display (e.g., 304 of FIG. 3) using a drive scheme such as the GL drive scheme. The method then introduces or performs a time delay, followed by updating a second portion (e.g., 306 of FIG. 3) of the display, and in this manner, gives an illusion of motion as the page updates. FIG. 3 shows a possible sequence of the segment-by-segment updating in dark mode. Updating the display in this manner creates the illusion of "swiping" the page. The direction of this "swipe" can be left to right, right to left, top to bottom or bottom to top, and can be inferred by detecting the action of the user's input on the touch panel, giving the user an impression of control of the action of the display. As shown, updating the display from a completely black page 300 to the updated page 302 can occur through a series of segmented updates. Starting at a first segmented update 304, only a portion of the display is updated and a portion of the text is displayed. Subsequently, after a short delay t, a next segment 306 may be updated onto the display. The subsequent segments 308-322 may be updated onto the display in a similar fashion, with the short delay t in between, until the display is completely updated. Updating of the display is paused or suspended during the time delay T. This method of updating can create an illusion of swiping a page, providing less flash compared to a single update of the entire display.

Figure 4:
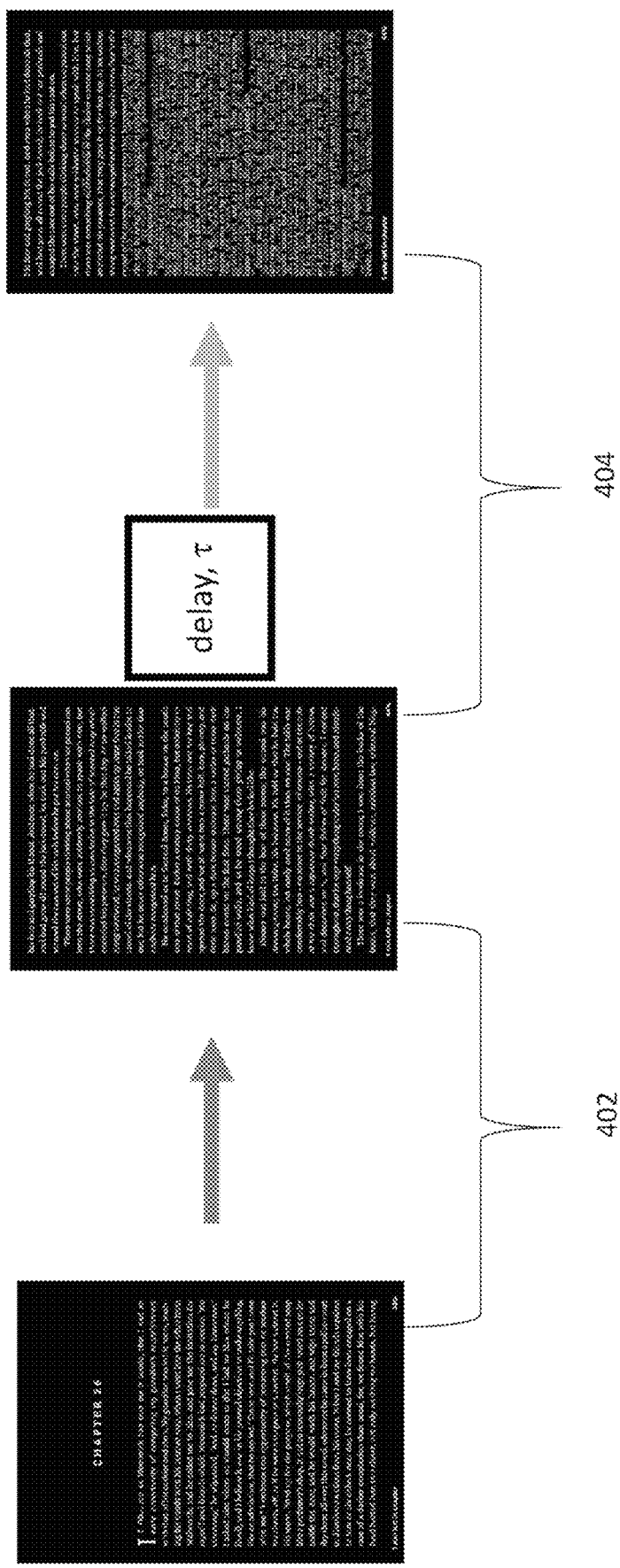
FIG. 4 illustrates a dark mode swipe operation with edge clearing.

When operating in dark mode and using a segmented and low flash drive scheme as described above, sometimes the driving or updating cycle may include two phases. Referring to FIG. 4, in phase 1 402, one may perform the swiping action without any post drive discharge. And in phase 2 404, one may perform an edge clearing action. In this setup, the phase 1 updating 402 may use a low flash, Global Limited (GL) drive scheme whereas the electro-optic display is updated through a multi-segmented swipe, as illustrated in FIG. 3. Alternatively, the electro-optic display may be updated with a single or 1 segment swipe. Subsequently, transitioning from a current image to a next image, an imaging algorithm may be used to identify and/or determine the pixels that are likely to develop blooming and/or edge artifacts. One example of a such algorithm is presented below:

```
For all pixel locations (i, j) in any order:
    If the currentpixels (i, j) is black and nextpixels (i, j) is black
        then assigns edgepixels (i, j) = nextpixels (i, j)
    Else if at least one cardinal neighbors of currentpixels (i, j)
        not black and nextpixels (i, j) of black, assigns edgepixels (i, j)
        = edgeclearstate
    Else if the currentpixels (i, j) is not black and nextpixels (i, j )
        is black and at least one cardinal neighbors of
        currentpixels (i, j) and nextpixels (i, j) of black, assigns
        edgepixels (i, j) = edgeclearstate
    Otherwise edgepixels (i, j) = nextpixels (i, j)
End
    where
```

-continued

- nextpixels (i, j) denotes the next image pixel at location (i, j)
- currentpixels (i, j) denotes the current pixel at location (i, j)
- cardinal neighbors denotes the north, south and east, west neighbors to a pixel
- edgeclearstate denotes the special edge clearing pixel state In practice, the above mentioned algorithm identifies and/or flags display pixels that will develop edge artifacts and applies an edge clearing waveform to these pixels. For example, for a particular display pixel, if at least one cardinal neighbor of the display pixel has a current optical state that is not black and a next optical state of black (i.e., the cardinal neighbor pixel is going through active optical transitions), this particular display pixel is deemed to be likely to develop edge artifact and is flagged accordingly. Accordingly, this particular display pixel will receive an edge clearing waveform in phase 2. Moreover, if a particular pixel has a current optical state that is not black and a next optical state that is black, and at least one cardinal neighbor pixel with a black current optical state and black next optical state, then this particular display pixel is deemed likely to develop edge artifact and is flagged accordingly.

It has been observed that the swiping algorithm described herein can also be used for displays presenting black text on a white background. For example, substituting "white" for "black" in the algorithm presented above would yield an algorithm suitable for non-dark mode operation.

In some embodiments, in phase 2 404, the clearing of the edge artifacts can commence after the end of the phase 1 402 updating, where a time delay τ can be inserted in between the two phases. In practice, for seamless transition appearance and to avoid the user from detecting undesirable edge artifacts, τ should be as small as possible. To do this in practice one may either: (1) perform a pipelined update of the edge map with a special edge erasing DC imbalanced waveform with post drive discharging, or (2) change the waveform look-up-table to include the edge clearing waveform, and justify the rest of the standard transitions by inserting zero scan frames before the edge clearing waveform, as shown in FIG. 5.

Figure 5:
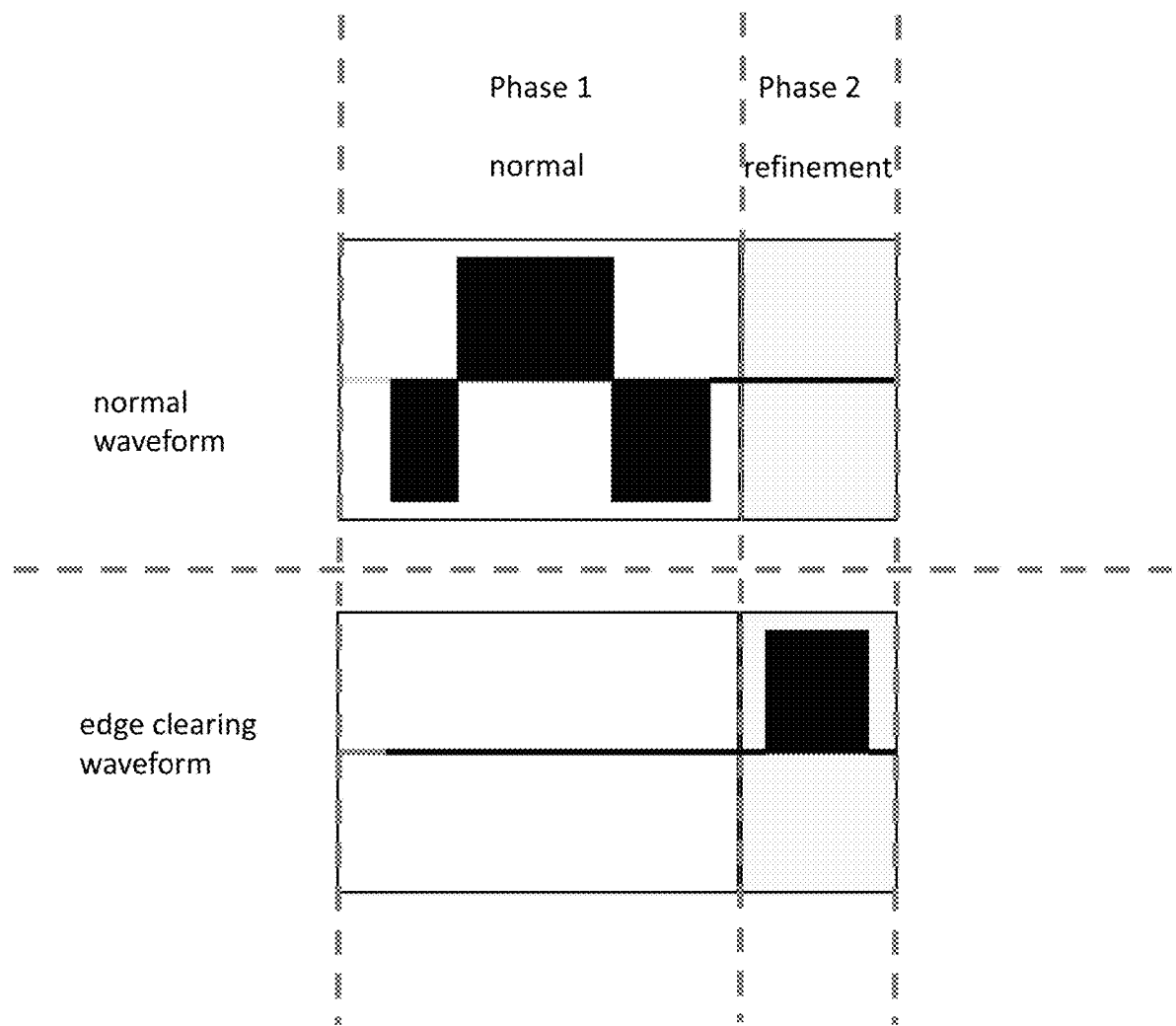
FIG. 5 are waveforms for implementing the dark mode swipe operation.
Figure 6:
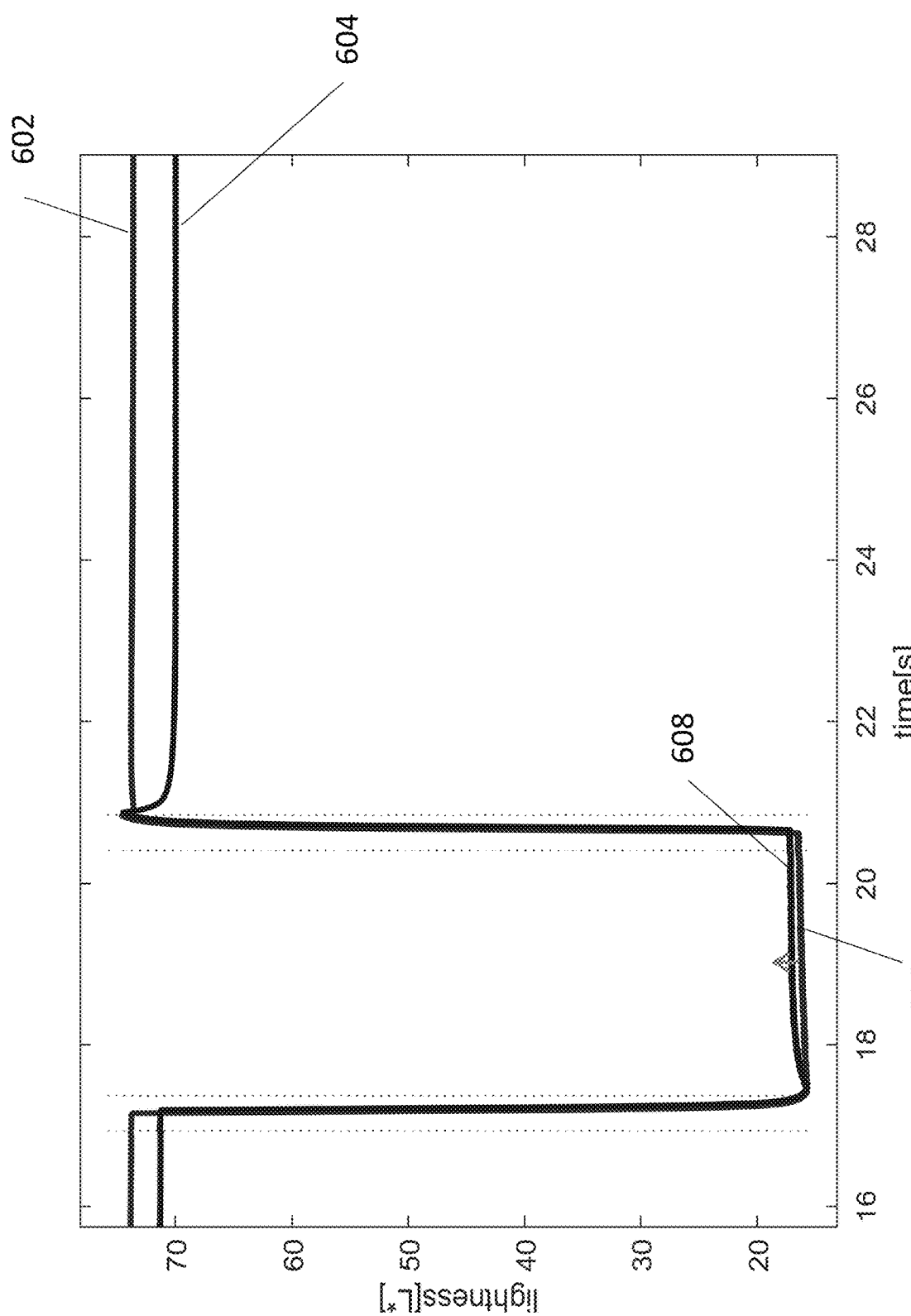
FIG. 6 illustrates optical kickback of white and black rail due to post drive discharging.

As shown in FIG. 5, performing the updating scheme as described herein provides the option of not using a post drive discharge to discharge the built up remnant voltages, where post drive discharging can result in higher optical kickbacks. FIG. 6 illustrates a comparison of resulting optical kickback when post drive discharge is applied. The blue line 604 shows an increased optical kickback on the white rail (e.g., the voltage potential applied across the ink to drive the display to a white state) due to post drive discharging, compared to the red line 602 when no post drive discharging is applied. Similarly, the blue line 608 shows an increased optical kickback on the black rail (e.g., the voltage potential applied across the ink to drive the display to a black state) due to post drive discharging, compared to the red line 606 when no post drive discharging is applied.

Figure 7:
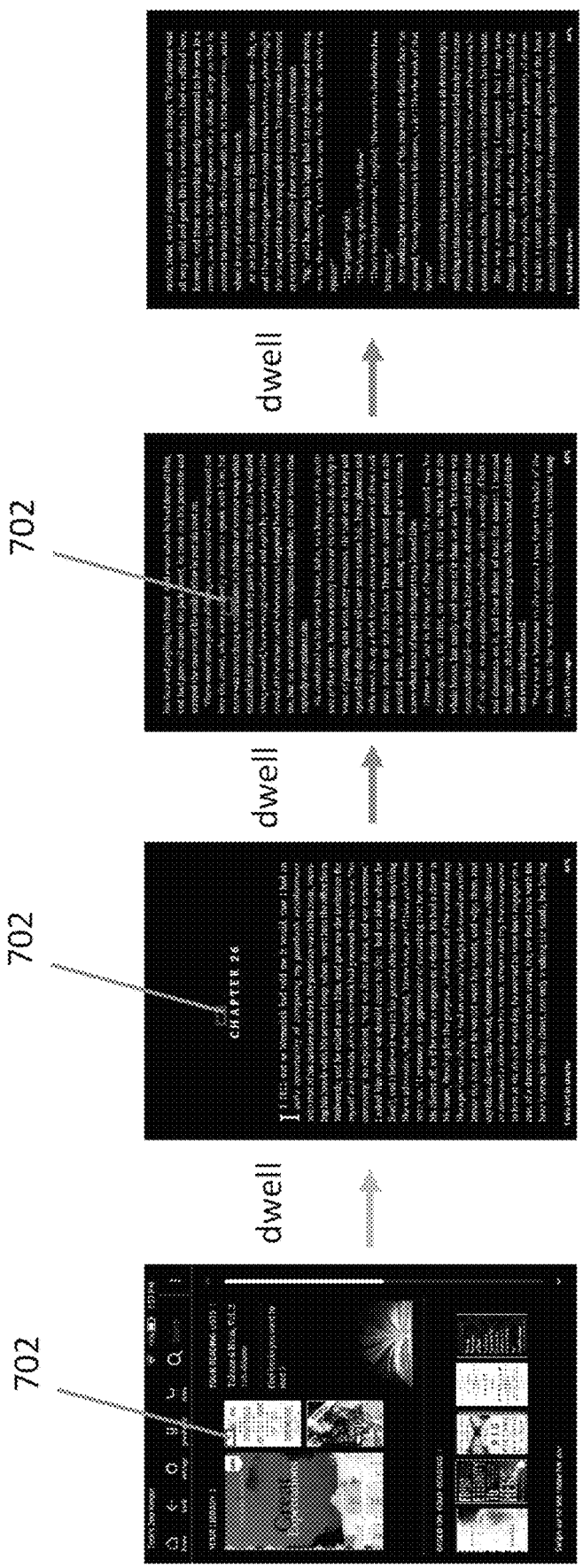
FIG. 7 illustrates the benefit of the two phase updating drive scheme in accordance with the subject matter disclosed herein.

In practice, applying the drive scheme as described herein allows one to perform the multi-segmented swipe in dark mode without producing edge artifacts. Furthermore, optical kickback can be reduced in a typical usage scenario as shown in FIG. 7. "Kickback" or "self-erasing" is a phenomenon observed in some electro-optic displays (see, for example, Ota, I., et al., "Developments in Electrophoretic Displays", Proceedings of the SID, 18, 243 (1977), where self-erasing was reported in an unencapsulated electrophoretic display) whereby, when the voltage applied across the display is switched off, the electro-optic medium may at least partially reverse its optical state, and in some cases a reverse voltage, which may be larger than the operating voltage, can be observed to occur across the electrodes. Motivated by this usage scenario, the black background is always set by the use of a waveform which requires no edge clearing and hence negates the need for post drive discharging. The use for edge clearing comes only when the dark mode GL (i.e. empty black to black transition and/or white to white transition) is initiated in the next update sequence during which time a combination of the dwell and the update time of the GL transition has elapsed.

Figure 8:
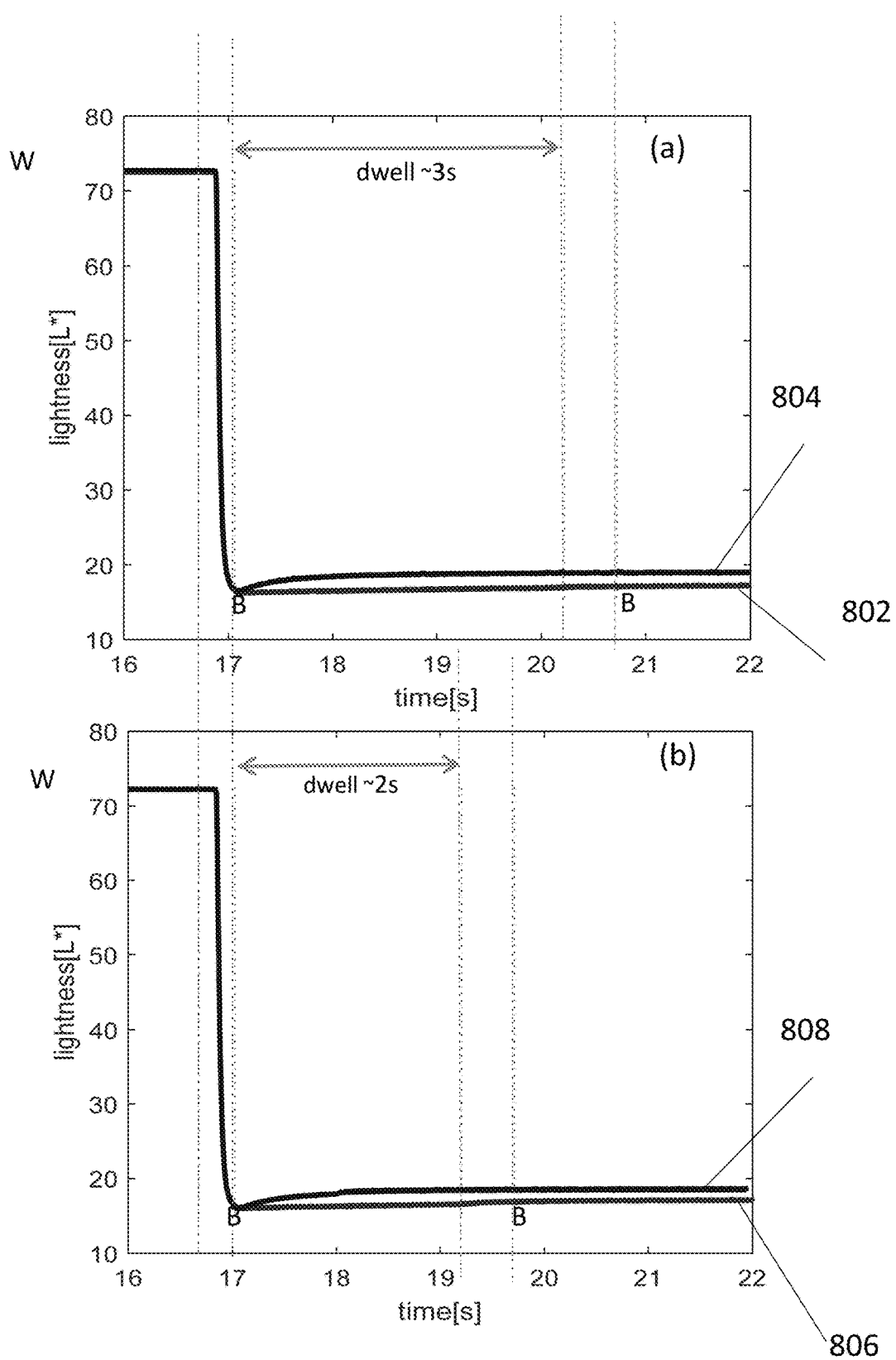
FIG. 8 illustrates black optical kickback with the two phase updating drive scheme.

In FIG. 7, the red box 702 is an area where the detailed optical traces shown in FIG. 8 were captured during the important transition of setting the black background, where we have the following transition: White→Black→Black. FIG. 8 provides the optical trace comparing the case where we employ the proposed strategy (red line) 802, 806 and the alternative strategy for dark mode implementation (blue line) 804, 808. With the proposed strategy (red line) 802, 806, we have: White→Black using a waveform without post drive discharging to set the black background, and Black→Black using the low-flash empty black to black waveform that ends with edge clearing with post drive discharging.

In addition, in some embodiments, one may perform a White→Black transition using a specialized waveform with post drive discharging to set the black background Black→Black using the low-flash empty black to black waveform and edge clearing with post drive discharging. As shown in FIG. 8, the proposed strategy (blue line) 804, 808 maintain a darker black than the current commercial strategy (red line) 802, 806. This is because the proposed strategy sets black using a specialized waveform without the need for post drive discharging, and when post drive discharging is needed subsequently in phase 2 for edge clearing of the low-flash waveform, the black has already been set in place for a time duration of, T, where $T$=dwell time+update time for the low flash waveform+τ

T allows for the natural decay of residual charges in the ink system, reducing the optical kickback due to the assertion of post drive discharging on the black background. As shown in FIG. 8, as T reduces, the black of the proposed strategy will be less black with more optical kickback in phase 2 of the proposed low flash waveform.

In one embodiment of the implementation, the minimum T can be pre-set to a value where the optical kickback is acceptable, then τ can be adjusted accordingly i.e.

τ=max(0,$T$-dwell time-update time for the low flash waveform)

In another embodiment, update time for the low flash waveform+τ is always set to the acceptable optical kickback level. In yet another embodiment, the first low-flash update after which the black is set should always have a large T to ensure the majority of the black background stays black, and should employ an over darken drive on areas where the optical kickback is expected on subsequent low-flash update. The proposed approach can also be used in the day mode (i.e., displaying black text on a white background). In its generalization, this strategy involves using: phase 1 as a drive mechanism to reach a desired coarse optical state (in this case, displaying text on black background but with issues with edge artifacts) and phase 2 as a drive mechanism to refine the optical state (in this case, clearing edges).

The techniques described above provide an improved user experience by reducing the apparent flashiness of transitions between images. In addition, the image update pattern that is presented in response to the user's swipe motion gives the user the perception of control over the action of the display, while the update pattern creates the pleasing impression of turning the page of a traditional printed book. For example, a user can be viewing some form of digital content (e.g., electronic book, webpage, etc.), the entire contents of which are too large to view as a single image on the display screen. Using the swipe techniques described above, the user can advance (or go back) through the digital content one image (e.g., page) at a time. Each subsequent image presented on the display includes the next adjacent portion of the digital content that will fit on the display, and none of the content of the prior image is displayed. As an example, a user reading page 10 of an electronic book can swipe to advance to page 11. The techniques described above can be used to update the display with the content of page 11, and none of the content of page 10 remains on the display after the update.

In addition to presenting digital contents in an image-by-image mode to emulate the page-by-page presentation of traditional printed books, it is also common for display devices to be capable of presenting digital contents (e.g., electronic books, webpages, etc.) in a continuous scrolling mode. For example, conventional display devices can be configured to fluidly and continuously scroll through digital content in response to touch input from a user (e.g., a swipe) for touch-enabled devices.

Continuous scrolling operations can employ different drive schemes. Drive schemes using direct update waveforms such as DUDS have the advantage of lower refresh time and less flashiness, but only support transitions between black and white states. As such, DUDS can be insufficient for providing a smooth animated update to the display during a scrolling operation. The GL and GLR drive schemes have the advantage of including waveforms that support transitions between all gray levels. Such drive schemes can be used for scrolling, but can appear flashy with longer transition times, as discussed above.

Accordingly, as discussed above, continuous scrolling can be a challenge for a display device incorporating an electrophoretic display due to the time required to refresh the display and the perceived flashiness resulting from the update waveforms. The technology described herein includes features for addressing these deficiencies of conventional displays in displaying content in a continuous scrolling mode. For example, the above-described page swipe techniques can be further enhanced to provide additional improvements to the user experience during continuous scrolling operations on electrophoretic displays.

Figure 9:
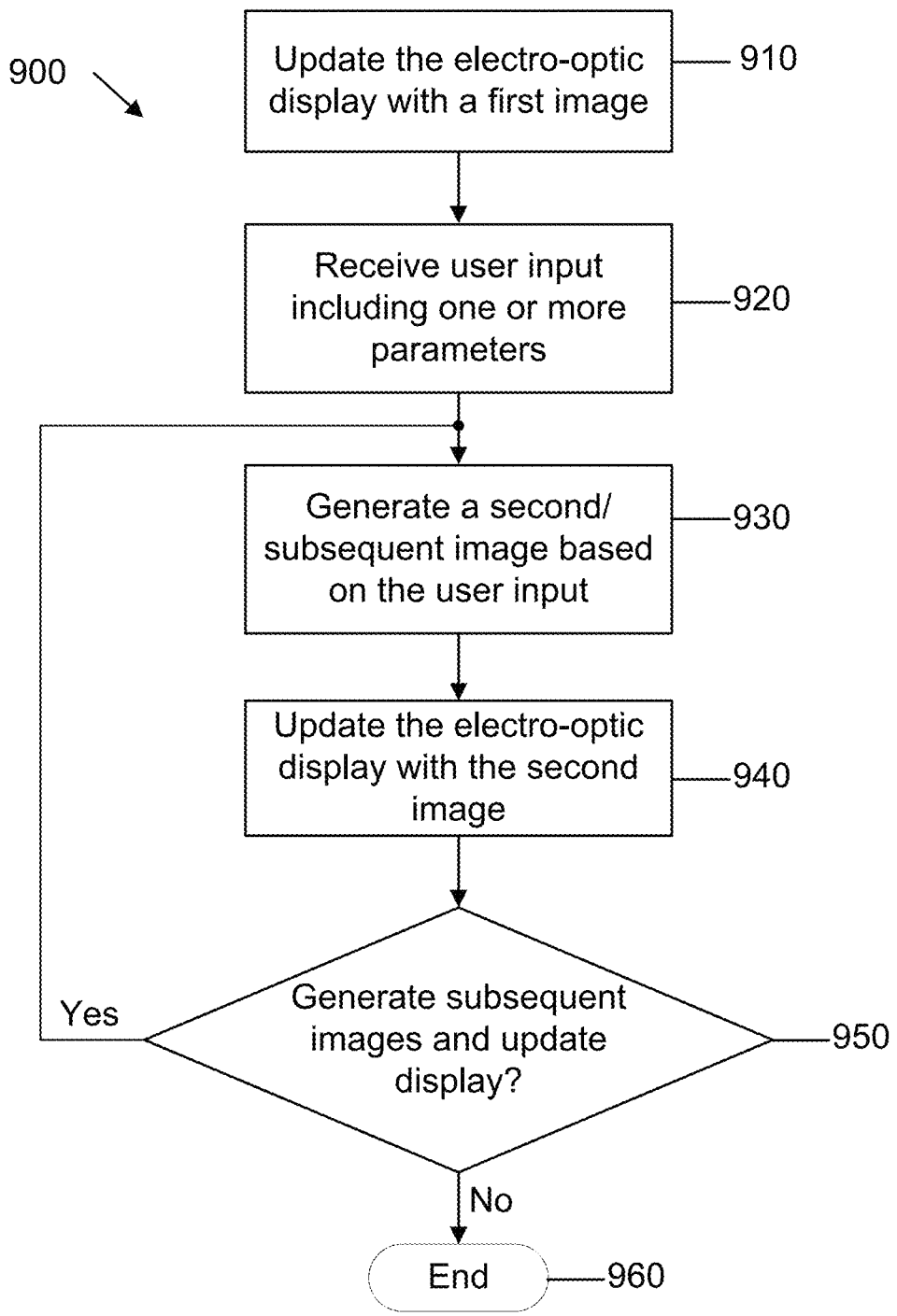
FIG. 9 illustrates the steps of a method for presenting content in a continuous scrolling mode.
Figure 11:
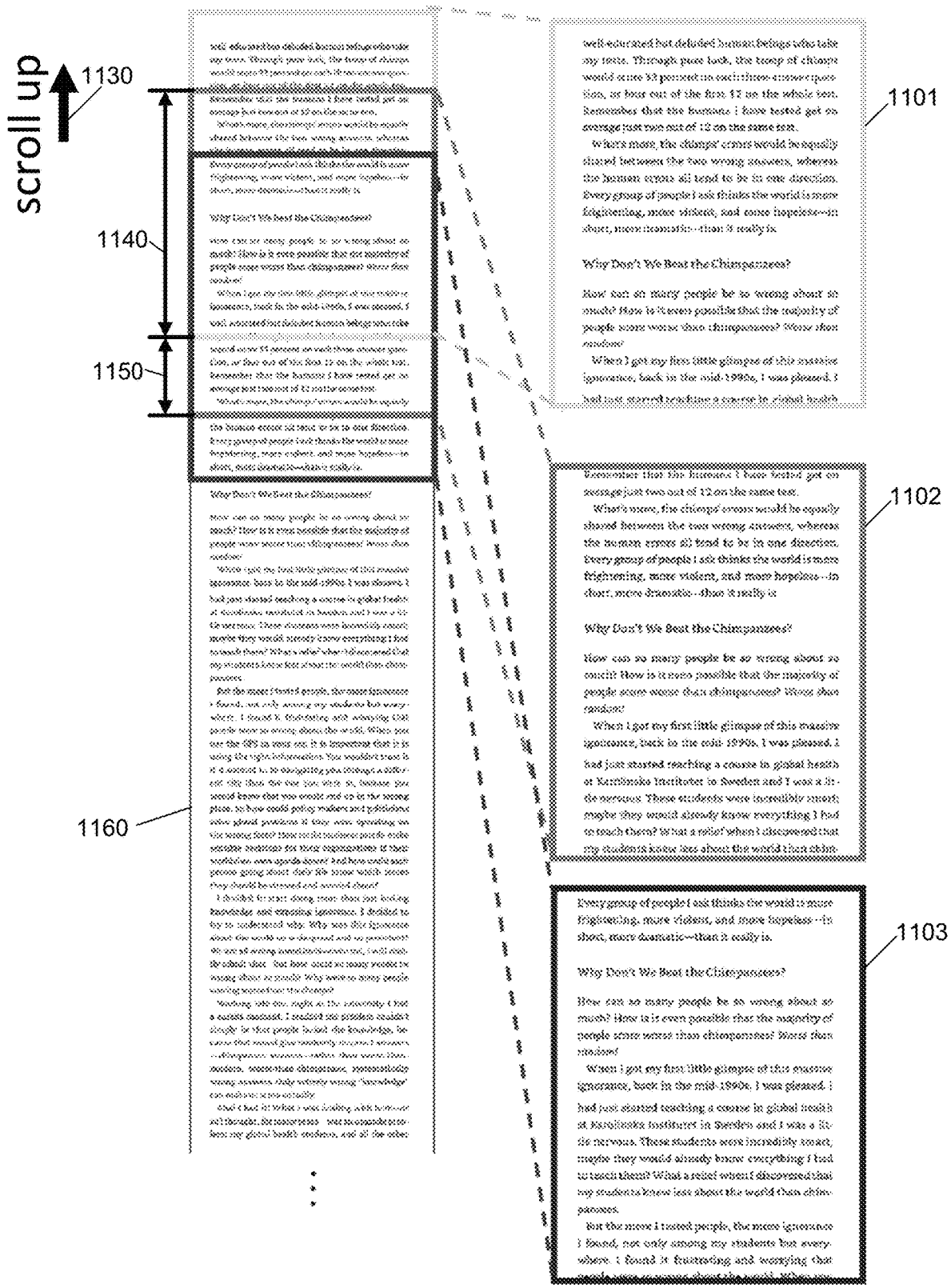
FIG. 11 is an exemplary diagram showing the operation of a method for presenting content in a continuous scrolling mode according to embodiments described herein.

FIG. 9 illustrates the steps of a method 900 for presenting content in a continuous scrolling mode. The method 900 includes updating (910) the electro-optic display with a first image. For example, the electro-optic display can be updated with a first image 1101 (FIG. 11) including image data from a first portion of scrollable content such as scrollable content 1160 as shown in FIG. 11.

Figure 10:
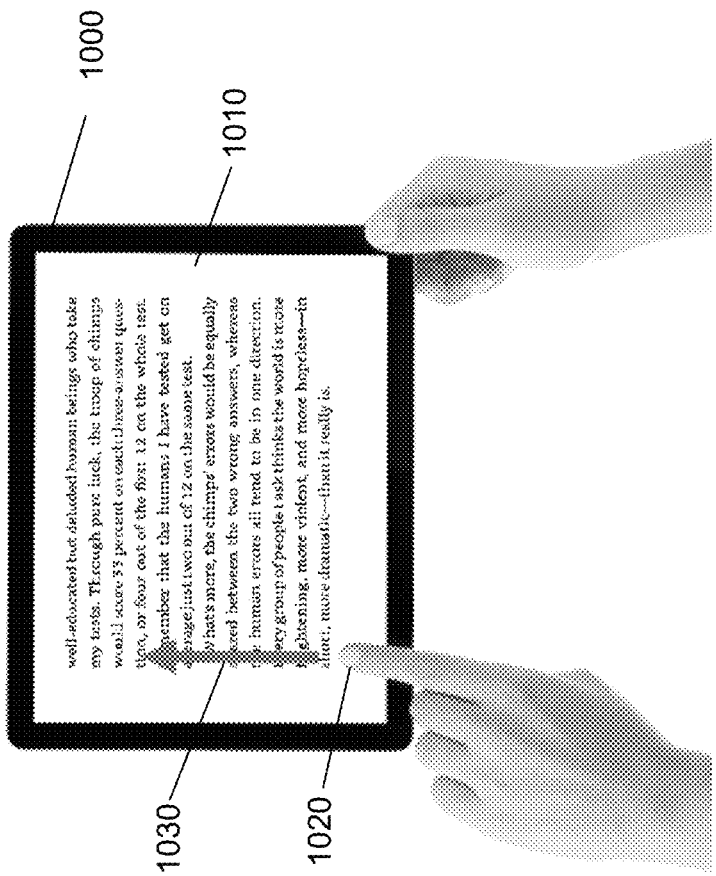
FIG. 10 illustrates an exemplary display device according to embodiments described herein.

Next, the method 900 can include receiving (920) a user input including one or more parameters. For example, the user input can be a swipe gesture applied to a touch panel surface of the electro-optic display to indicate a user's desire to scroll the displayed content. Referring to FIG. 10, the display device 1000 can detect the action 1030 of the user's input 1020 on the touch panel 1010. Input 1020 can be a gesture applied by the user's finger (e.g., swipe, drag, flick, pinch in, pinch out, etc.). In some embodiments, input 1020 is applied by an active or passive input device such as a stylus or computer mouse.

The display device 1000 can detect certain characteristics or parameters about input 1020. For example, the directionality of input 1020 can be detected, as described above. In some embodiments, the display device 1000 can detect a parameter indicative of the desired scroll speed. For example, the magnitude of the speed with which the user applies input 1020 to the touch panel 1010 can be used as a parameter indicative of the desired scroll speed. In some embodiments, the desired scroll speed is inferred based on the magnitude of the linear distance or stroke length of input 1020 on the touch panel 1010. For example, a drag gesture that spans one inch of the touch panel 1010 could infer a slow desired scrolling speed, while a drag gesture that spans 3-4 inches of the touch panel 1010 could infer a desire for a faster scrolling speed. In some embodiments, the desired scrolling speed is inferred based on at least one of the speed with which the user applies a first input 1020 to the touch panel 1010 and the duration of time from when the user applies a first input 1020 to the touch panel 1010 to the time when the user applies a second input 1020 to the touch panel 1010. In some embodiments, the magnitude of the pressure the user applies as input 1020 to the touch panel 1010 can be used as a parameter indicative of the desired scroll speed.

Returning to FIG. 9, after receiving user input, the method 900 includes generating (930) a second image based on at least one parameter of the user input. This can be thought of as an image separation operation that determines which image data of scrollable content 1160 will be the next image presented on the display. Parameters of the detected input 1020 are used to define how the image separation operation functions to generate the second image. FIG. 11 provides an example of three images, image 1101, image 1102, and image 1103, resulting from an image separation operation based on detection of action 1130, in this case a request to scroll up the scrollable content 1160. The "scroll up" action 1130 is the user input received while the user is viewing the portion of the scrollable content 1160 denoted by image 1101. In response to the parameters of action 1130, the image separation operation identifies the portion of the scrollable content 1160 denoted by image 1102 as the next image to be presented during the scrolling operation.

Unlike the page-by-page swipe mode described above where each subsequent image presented on the display includes none of the content of the prior image, the image separation operation of the scrolling mode is configured such that each subsequent image presented on the display includes at least a subset of the content of the prior image. For example, as shown in FIG. 11, image 1101 (e.g., a first image) includes image data from a first portion of the scrollable content 1160. Image 1102 (e.g., a second image) includes a subset 1140 of the image data from image 1101, while the remainder of the content of image 1102 is a second portion 1150 of the scrollable content 1160 including content that was not presented in image 1101.

Returning to FIG. 9, upon completion of the image separation operation and generating the second image, the method 900 includes updating (940) the electro-optic display with the second image. For example, the second image can be presented on the display using the "swipe updating" techniques described above. The segmented and low flash drive scheme as described above in connection with FIGS. 1-8 can be used to transition from image 1101 to 1102, along with the above-mentioned algorithm used to identify and/or flag display pixels that will develop edge artifacts and apply an edge clearing waveform to these pixels.

According to the swipe updating techniques, a first segment of the second image can be presented at a first portion of the electro-optic display. The position of the first segment can be based on an initial point of contact of the swipe gesture and the direction of the swipe gesture. For example, if the initial point of contact of the user's swipe gesture was in proximity to the bottom of the display continuing toward the top of the display, the first segment of the second image can be presented at a first portion of the electro-optic display that is at the bottom of the display.

After the display has been updated with image 1102, the method 900 reaches a decision point (950) where it can return to step 930 and perform another image separation operation to generate a subsequent image followed by updating the display with the subsequent image if the scrolling operation is to continue. For example, if the magnitude of the linear distance of the swipe gesture is large, the method can continue to generate images and update the display several more times. Alternatively, the method 900 ends (960), leaving the most-recently-presented image on the display. In the example illustrated by FIG. 11, the method 900 performs a subsequent image generation (930) and identifies the portion of scrollable content 1160 denoted by image 1103 (e.g., a third image) as the next image to be presented during the scrolling operation. Following the image generation operation (930), updating (940) is used to transition from presenting the content of image 1102 to presenting the content of image 1103.

Whether or not to continue a scrolling operation can be based on parameters of action 1130. The speed and/or length of the gesture applied to the touch screen can be used to infer how far ahead of (or back from) the current image the user would like to scroll. For example, a speedy and/or long action 1130 can be used to infer that user desires for the scrolling operation to advance several images from the current image. In some embodiments, the display is configured to advance a fixed number of images in response to a request to scroll content.

As described above, each subsequent image identified and generated by the image generation or separation operation (930) includes a subset portion of the content from a previous image, and a new portion including content that was not presented in the previous image. The parameters of action 1130 can also be used to infer how much of the subsequent image should comprise the subset portion, and how much should be the new portion. For example, a slower and/or shorter gesture applied to the touch screen as action 1130 can be used to infer that the user desires to scroll at a slow rate. Accordingly, in this case, the subset portion 1140 of the image identified by the image generation operation (930) would comprise a far greater percentage of the image than the new portion 1150. In other words, the proportion of the subset portion 1140 of the image data from the first image (e.g., the first portion of the scrollable content 1160) to the image data from the second portion 1150 of the scrollable content 1160 that is not found in the first image varies depending on the magnitude of the speed of the swipe gesture.

Figure 12:
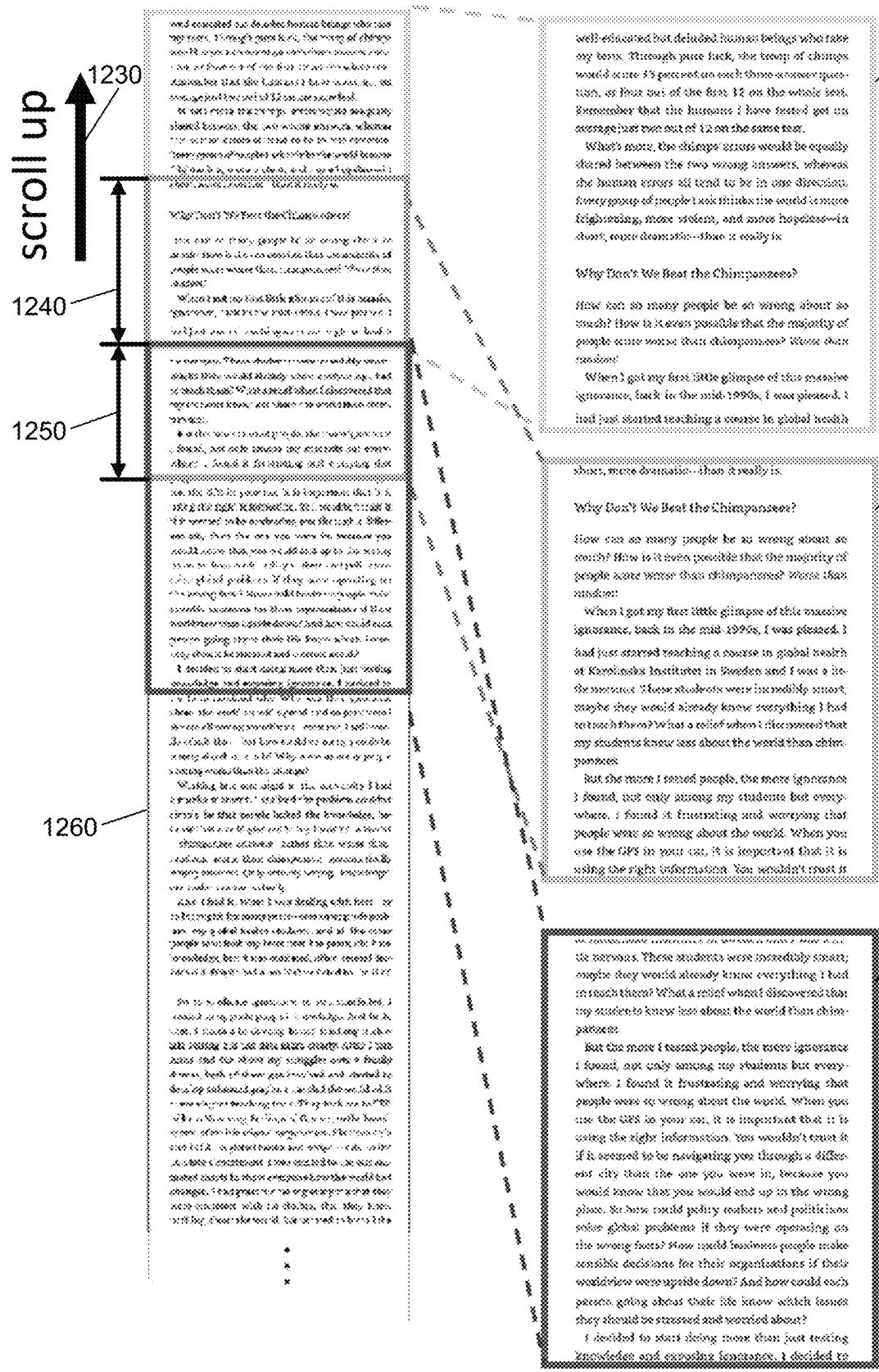
FIG. 12 is an exemplary diagram showing the operation of a method for presenting content in a continuous scrolling mode according to embodiments described herein.

FIG. 12 provides another example illustrating the operation of the method 900. (For ease of comparison, structures of FIG. 12 that are similar to FIG. 11 are generally annotated with similar reference numerals.) The arrow symbol signifying action 1230 is notably larger than the arrow symbol signifying action 1130 in FIG. 11. This is meant to denote that the magnitude of at least one of the parameters of action 1230 (e.g., speed, length, pressure, etc.) is greater than the same parameter of action 1130. For example, action 1230 can denote a faster and/or longer gesture applied to the touch screen. Accordingly, to give the illusion of a farther "jump" in the scrolling mode, the subset portion 1240 and the new portion 1250 of the image identified by the image generation operation (930) are nearly equal in size.

In some embodiments, the parameters of action 1130/1230 are used to infer the desired duration of the scrolling operation. For example, the speed and/or length of a gesture applied to the touch screen can be an indication of how many images the method 900 will present during a scrolling operation. In some embodiments, the parameters of action 1130/1230 are used to infer the desired perceived acceleration and deceleration rate of the scrolling operation. For example, a fast and/or long gesture applied to the touch screen cause the method 900 to initially present subsequent images for which the subset portion 1140/1240 is far smaller than the new portion 1150/1250 of the image to give the illusion of an accelerated or fast scrolling. The method 900 can then gradually change the proportions of the subset portion 1140/1240 to provide the illusion of deceleration, and finally, the method 900 can end, stopping the scrolling operation.

Figure 13:
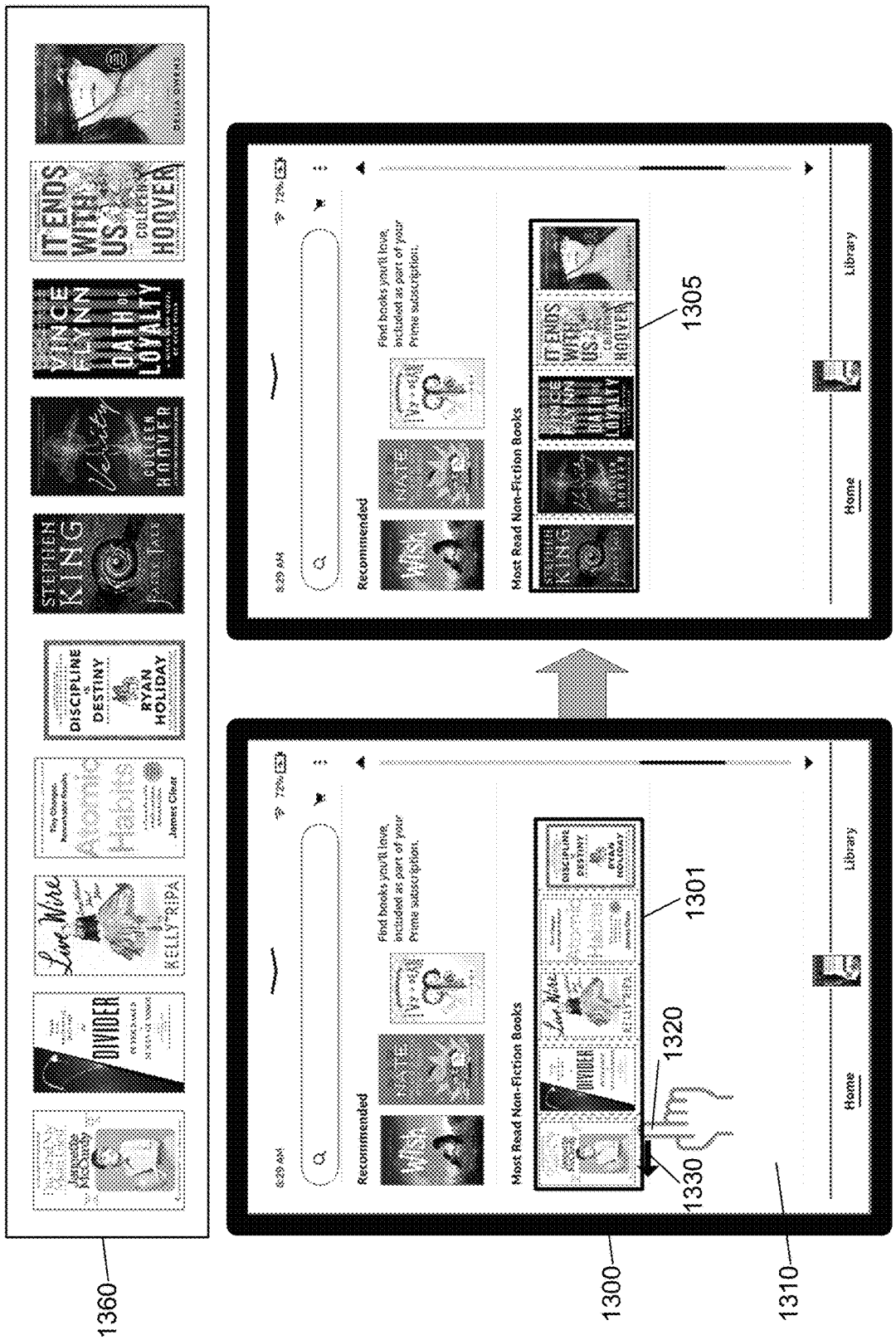
FIG. 13 is a diagram illustrating the continuous scrolling operation on a portion of an image.

FIG. 13 is a diagram illustrating the continuous scrolling operation on a portion of an image. In the view of FIG. 13 denoted "Initial State," display device 1300 is presenting an image on touch screen 1310. A portion of the image displayed on touch screen 1310 includes sub-image 1301, which is an image displaying a subset of the content of digital content 1360. In this embodiment, the methods described herein can be used to detect the action 1330 of the user's input 1320 on the touch panel 1310, and perform a scrolling operation to scroll through the contents of digital content 1360. In this embodiment, the scrolling operation is only performed on the sub-image 1301 portion of the display screen. The other contents of the displayed image do not change.

In the view of FIG. 13 denoted "Final State," display device 1300 is now presenting sub-image 1305 which includes the last contents of digital content 1360. Accordingly, it can be inferred that the method 900 identified and transitioned to four sub-images (e.g., sub-images 1302-1305) in the course of the scrolling operation applied to the content of digital content 1360 from the Initial State to the Final State. This embodiment avoids unnecessary distraction when scrolling complex images, leaving the directionality of scrolling to the swipe updating. Scrolling transitions can also be performed faster as only a portion of total displayed image changes during each update.

Figure 14:
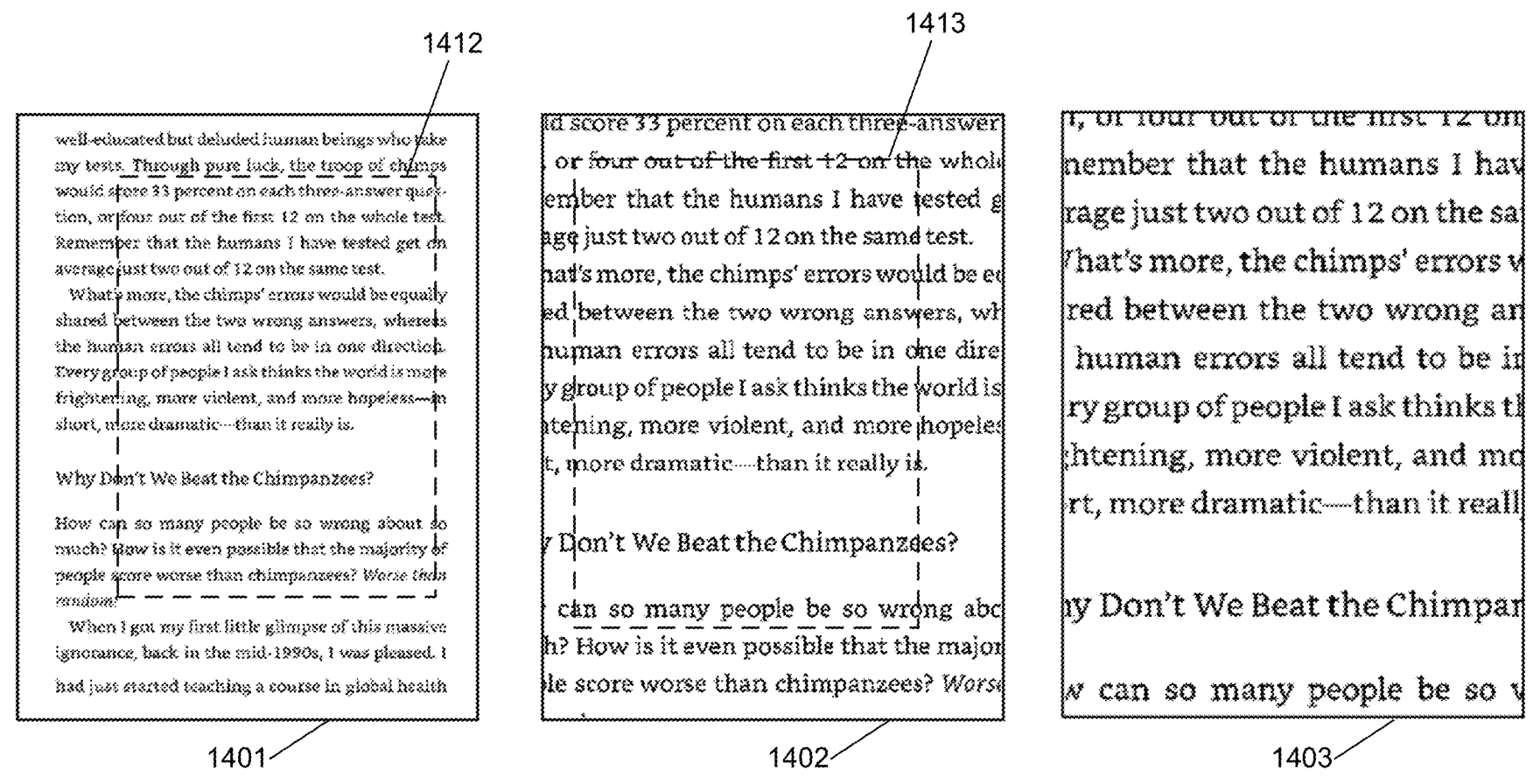

In another embodiment, the image being displayed makes up the digital content, and the techniques described herein can be applied to display portions of the image in a different format. For example, techniques described herein can be applied to enable a zoom function. FIG. 14 is an exemplary diagram showing images processed according to embodiments described. Image 1401 displays a text passage from an electronic book. Image 1402 has the same dimensions as image 1401, but displays only a subset 1412 of the content of image 1401. Further, the format of the content displayed in image 1402 has been modified, in this case, enlarged as part of a zoom operation. Likewise, image 1403 has the same dimensions as image 1402, but displays only a subset 1413 of the content of image 1402. Further, the format of the content displayed in image 1403 has been modified, in this case, enlarged as part of a zoom operation.

Figure 15:
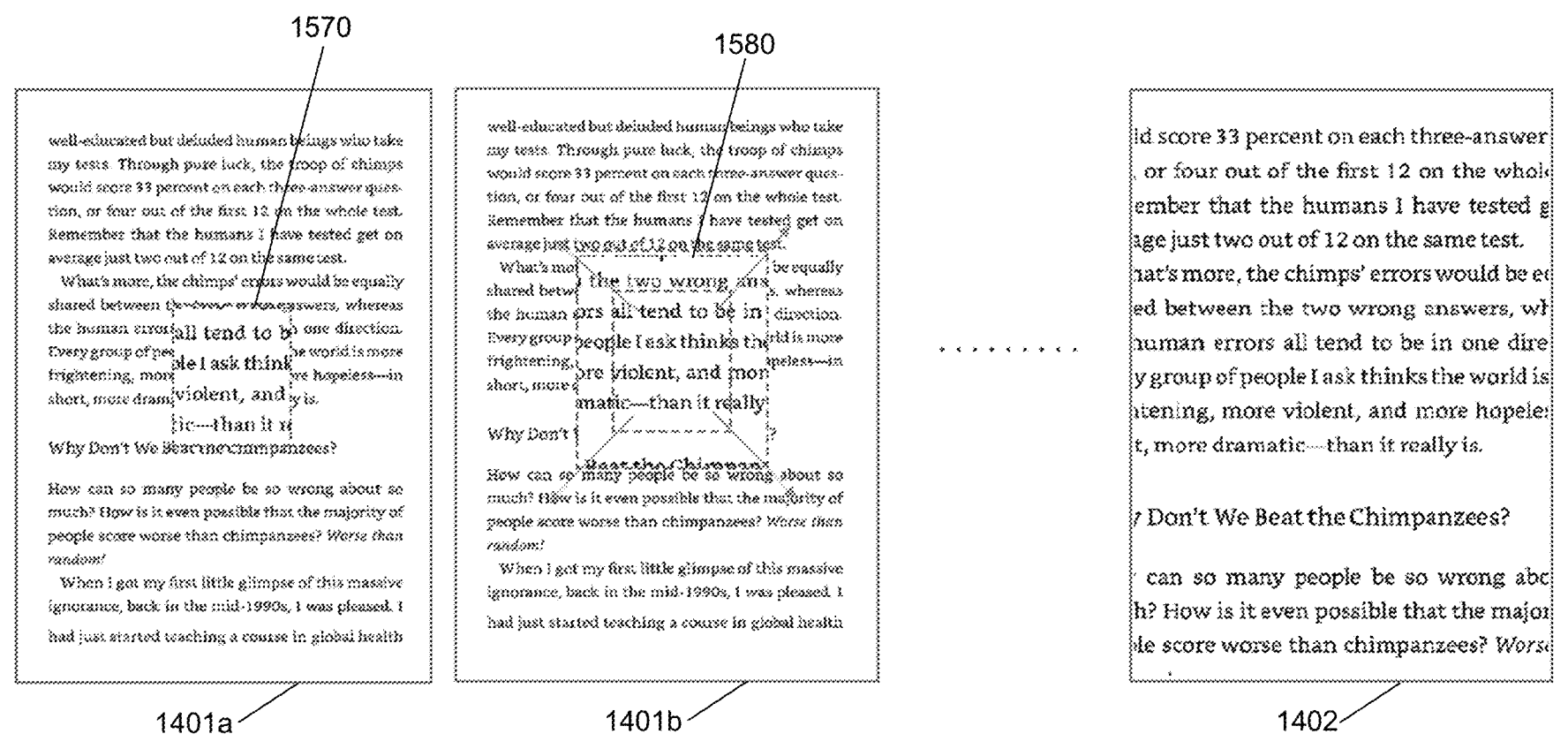

FIG. 15 is an exemplary diagram showing the operation of a method for presenting content in a zoomed mode according to embodiments described herein. This figure illustrates a zoom transition from image 1401 (e.g., a first image) to 1402 (e.g., a second image). The method detects a request to zoom content. For example, the display device can detect a user's input indicating a zoom operation (e.g., a touch with two fingers and gesture of moving them away from one another, also referred to as a pinch out gesture). The method begins with an image 1401 which includes the same content as image 1401 shown in FIG. 14. The method begins the transition from image 1401 to image 1402 by first updating image 1401 with a first portion 1570 which is a first subset of the content of image 1402. Referring to FIG. 15, image 1401a shows the first segment or portion 1570 of image 1402 incorporated into or overlaid onto the contents of image 1401.

The method then continues by updating image 1401a with a second segment or portion 1580 which is a second subset of the content of image 1402. Referring to FIG. 15, image 1401b shows the second portion 1580 incorporated into or overlaid onto the contents of image 1401a. The method continues updating in this fashion until the entirety of the content of image 1402 is displayed. The segmented and low flash drive scheme as described above in connection with FIGS. 1-8 can be used to transition from image 1401 to 1402, along with the above-mentioned algorithm used to identify and/or flag display pixels that will develop edge artifacts and apply an edge clearing waveform to these pixel. In this case, the drive scheme performs regional updates to the display that do not begin at one of the edges of the display. For example, as shown in image 1401a of FIG. 15, a region in the center of the display is updated first with the first segment or portion 1570 to give the illusion of a zoom operation as additional segments of image 1402 are presented on the display.

Figure 16:
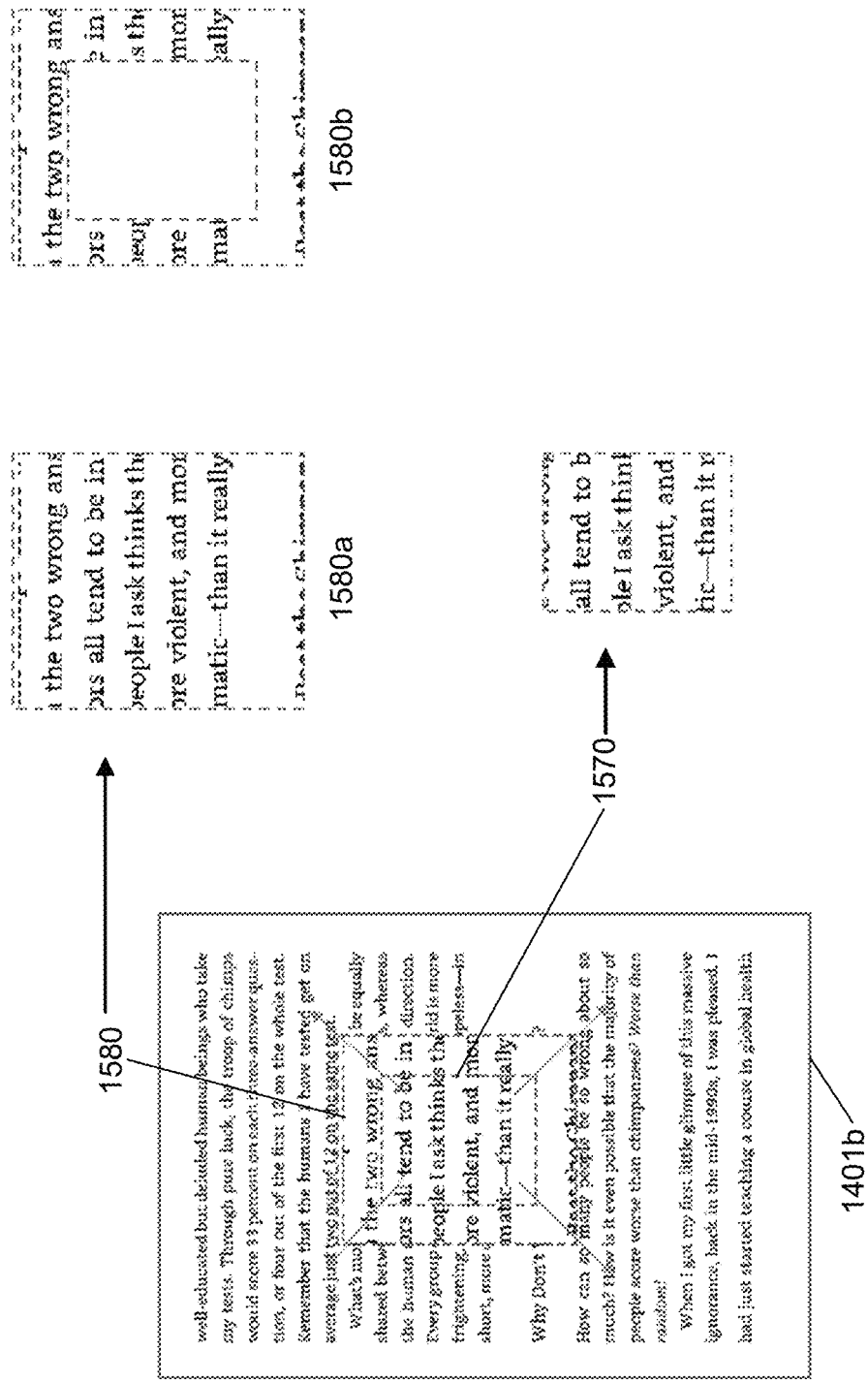
FIG. 16 is an exemplary diagram showing the operation of a method for presenting content in a zoomed mode according to embodiments described herein.

Referring now to FIG. 16, in some embodiments, second portion 1580 includes all of the content of first portion 1570, as represented by 1580a. In some embodiments, second portion 1580 does not include the content of first portion 1570, as represented by 1580b. This offers the advantage of faster updates during zoom operations because fewer of the display pixels are required to be updated when transitioning from image 1401a to image 1401b (or when transitioning from image 1401b to subsequent images until the entire contents of image 1402 are displayed).

Accordingly, the inventive techniques described herein can be used to improve the user experience by giving the illusion of flow and directionality of the separated images as they are transitioning. The use of swipe not only gives directionality to the scrolling which is important, but the animated way in which swipe updating progresses detracts from the perceived flashiness of the updates and gives the illusion of fluidity. The images are updated in quick succession using the "swipe updating" techniques to give an illusion of movement in the scrolling and zooming operations. Because the images are separated in such a way that the displayed image is indeed changing, the desired effect of having the user perceive that the content is moving is achieved in an animated way Further, the inventive techniques described herein can be use waveforms able to display full gray levels (e.g. GLR or Regal waveform modes), making it possible to update the display with images having pixels set to any gray level. Furthermore the inherent artifact clearing of the swipe update reduces or removes any undesirable image artifacts during or after continuous scrolling operations. Advantageously, these techniques can be applied to black text on a white background, night or dark mode (white text on black background) and CFA-based color displays.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A method for driving an electro-optic display having a plurality of display pixels, the method comprising:
   updating the electro-optic display with a first image comprising image data;
   receiving a user input comprising one or more parameters;
   generating a second image based on at least one parameter of the user input, wherein the second image comprises a subset of the image data of the first image but is enlarged to have dimensions equal to the first image;
   separating the second image into a plurality of portions of the second image;
   updating the electro-optic display with a first portion of the plurality of portions of the second image;
   updating the electro-optic display with a second portion of the plurality of portions of the second image, wherein the second portion does not include the content of the first portion.

2. The method of claim 1 further comprising:
   performing a time delay subsequent to updating the electro-optic display with the first portion of the plurality of portions of the second image, wherein updating of the electro-optic display is suspended during the time delay, and wherein the electro-optic display is updated with the second portion of the plurality of portions of the second image
   subsequent to the time delay.

3. The method of claim 2 further comprising applying an edge clearing waveform to the display pixels of the electro-optic display during the time delay.

4. The method of claim 2 further comprising:
   identifying display pixels with edge artifacts using an algorithm configured to flag a display pixel for having edge artifacts based on the display pixel's next optical state and the optical state of at least one of the display pixel's cardinal neighbors; and
   applying an edge clearing waveform during the time delay to the display pixels flagged by the algorithm.

5. The method of claim 2 wherein the second portion of the plurality of portions of the second image surrounds the first portion of the plurality of portions of the second image.

6. The method of claim 1 wherein the user input comprises a pinch-out zoom gesture on the electro-optic display.

7. The method of claim 6 wherein the user input comprises a parameter indicating a magnitude of a linear distance of the pinch-out zoom gesture.

8. The method of claim 7 wherein an amount the subset of the image data of the first image is enlarged in the second image is proportional to the magnitude of the linear distance of the pinch-out zoom gesture.

9. The method of claim 7 wherein a position of the first portion of the plurality of portions of the second image is based on an initial point of contact of the pinch-out zoom gesture.

* * * * *